United States Patent
Prabhu et al.

(10) Patent No.: US 8,610,492 B2
(45) Date of Patent: Dec. 17, 2013

(54) HIGH VOLTAGE TOLERANT INVERTING CHARGE PUMP

(75) Inventors: J. Raja Prabhu, Chennai (IN); Shyam Somayajula, Bangalore (IN)

(73) Assignee: ST-Ericsson SA, Plan-les-Ouates (CH)

(*) Notice: Subject to any disclaimer, the term of this patent is extended or adjusted under 35 U.S.C. 154(b) by 0 days.

(21) Appl. No.: 13/515,233

(22) PCT Filed: Dec. 10, 2010

(86) PCT No.: PCT/EP2010/069373
§ 371 (c)(1),
(2), (4) Date: Aug. 16, 2012

(87) PCT Pub. No.: WO2011/073095
PCT Pub. Date: Jun. 23, 2011

(65) Prior Publication Data
US 2012/0313695 A1 Dec. 13, 2012

(30) Foreign Application Priority Data
Dec. 16, 2009 (IN) .............................. 2629/DEL/2009

(51) Int. Cl.
*G05F 1/10* (2006.01)

(52) U.S. Cl.
USPC .............................. 327/536; 327/534; 327/535

(58) Field of Classification Search
USPC ......... 327/536, 534, 535, 537, 538, 540, 543, 327/530
See application file for complete search history.

(56) References Cited

U.S. PATENT DOCUMENTS

| | | | |
|---|---|---|---|
| 6,859,091 B1* | 2/2005 | Nicholson et al. | 327/536 |
| 7,626,445 B2 | 12/2009 | Lesso et al. | |
| 2005/0052220 A1 | 3/2005 | Burgener et al. | |
| 2005/0162213 A1 | 7/2005 | Yoshimura | |
| 2007/0273430 A1* | 11/2007 | Akashi et al. | 327/536 |
| 2008/0159567 A1 | 7/2008 | Lesso et al. | |
| 2009/0002064 A1* | 1/2009 | Tanaka | 327/543 |
| 2009/0121781 A1* | 5/2009 | Oyama et al. | 327/536 |

(Continued)

FOREIGN PATENT DOCUMENTS

| | | |
|---|---|---|
| EP | 0 489 412 A2 | 6/1992 |
| GB | 2 193 392 A | 2/1988 |
| KR | 10-913527 B1 | 8/2009 |
| WO | 95/17036 A1 | 6/1995 |

OTHER PUBLICATIONS

International Search Report issued in corresponding International application No. PCT/EP2010/069373, date of mailing Nov. 30, 2011.

(Continued)

*Primary Examiner* — Lincoln Donovan
*Assistant Examiner* — Jung H Kim
(74) *Attorney, Agent, or Firm* — Patent Portfolio Builders PLLC

(57) ABSTRACT

The present invention provides a high voltage tolerant regulated inverting charge pump circuit utilizing low-voltage semiconductor devices, capable of operation directly from a high voltage source. The circuit according to the present invention comprises a plurality of high voltage tolerant pre-driver circuits, connected to the high voltage source, for driving the charge pump low voltage switching devices appropriately for reliable operation. A flying capacitive element connected to the high voltage source through a plurality of low voltage semiconductor devices acting as a switch, peak current limiter, and cascode device. An output capacitive element connected to the flying capacitive element through a plurality of low voltage semi-conductor devices acting as a switch, peak current limiter, regulating element and cascode device. Further, the circuit of the present invention comprises a negative feedback controller connected to the output capacitor to regulate the output voltage over a wide range of load current.

11 Claims, 8 Drawing Sheets

(56) References Cited

U.S. PATENT DOCUMENTS

2009/0121782 A1* 5/2009 Oyama et al. ............... 327/536
2009/0212859 A1   8/2009 Lesso et al.
2010/0214010 A1* 8/2010 Burgener et al. ............ 327/536

OTHER PUBLICATIONS

International Preliminary Report on Patentability issued in corresponding International application No. PCT/EP2010/069373, report completion date: Apr. 17, 2012.

Thiele, G. et al., "Current Mode Charge Pump: Topology, Modeling and Control", 2004 35th Annual IEEE Power Electronics Specialists Conference, Aachen, Germany, Jun. 20-25, 2004, Piscataway, NJ, USA, IEEE, pp. 3812-3817, vol. 5, XP010738322, ISBN: 978-0-7803-8399-9.

Linear Technology Corporation; "100mA Regulated Charge-Pump Inverters in ThinSOT"; LTC 1983-3/LTC 1983-5; 1983; pp. 1-12; Milpitas, CA.

* cited by examiner

HIGH VOLTAGE TOLERANT INVERTING CHARGE PUMP

FIELD OF THE INVENTION

This invention in general, relates to inverting charge pumps. Particularly, the invention relates to a high voltage tolerant inverting charge pump that uses low-voltage MOS transistor devices.

DESCRIPTION OF THE RELATED ART

DC to DC converter is an electronic circuit which converts a source of direct current (DC) from one voltage level to another. A class of the DC-to-DC converters uses a charge pump, which includes a plurality of capacitors as energy storage and energy transfer elements to generate either a higher or a lower voltage from a given input DC voltage source. The charge pump based DC-to-DC converters are used to derive positive and negative voltages from a single power supply rail (e.g. a battery providing a positive voltage). The charge pumps that generate a negative voltage are typically referred to as "inverting charge pumps". The inverting charge pumps find several applications in portable ICs where, from a single voltage, both positive and negative voltages have to be generated. One such implementation is illustrated in FIG. 1 that illustrates an audio subsystem 100 of a mobile handset where an inverting charge pump 110 is utilized.

The audio subsystems 100 generally have one or more Audio Power Amplifiers (APA) 104a and 104b that are battery operated. Typically, the APA's 104a and 104b output common-mode level is expected to be ground (0 Volts) for ease of interface to standard external connectors. Positive rail of the APA is typically a positive voltage derived from a battery voltage ($V_{bat}$). Negative rail ($V_{neg}$) of the APA is typically a negative voltage derived from the battery voltage ($V_{bat}$) using a charge pump 110 based DC-to-DC converter 102. The APA's 104a and 104b receive a stereo/mono audio input 106 and provides an output signal to be fed to the speakers 108 connected to the audio subsystem 100 (and the mobile handset) through standard connectors. The DC-to-DC converter 102 is typically a capacitive charge pump based converter that generates $V_{neg}$ from $V_{bat}$ owing to its reduced external component cost and area as compared to inductive DC-to-DC converters.

One such capacitive charge pump based DC-to-DC converter 200 is shown in FIG. 2, that uses a regulator 202 for generating an intermediate smaller positive voltage with respect to voltage $V_{bat}$ from the battery 204. The regulator 202 requires on-chip area outside of the charge pump 206 and an extra IC pin for a regulating capacitor $C_{reg}$ 208. On-chip area in IC's is of great premium, an extra pin and an extra external capacitor is a huge area and cost penalty given the small size of the mobile device, and the modern day printed circuit boards (PCBs).

In addition, the output of the charge pump 206 can be regulated by known methods, such as, skipping clock signals that trigger the charge pump 102 or by current control based linear regulation. The clock skipping based regulation results in variable frequency spectrum of the charge pump output, based on the changes in load current. Such variable frequency spectrum is highly undesirable in hi-fidelity audio applications. The current mode control based linear regulation (as published in a paper titled "Current Mode Charge Pump: Topology, Modeling and Control" authored by Gerhard Thiele, Erich Bayer) has a limited load current range ($I_{max}$/$I_{min}$~40). However, for high-efficient audio applications, a higher load current ratio (e.g. $T_{max}/T_{min}$~1000) is desirable.

Another solution available in the art is an inverting charge pump designed in an expensive High Voltage (HV) process technology. However, use of HV process technology for the charge pump alone does not lend itself to integration on a System-on-Chip (SoC) environment.

SUMMARY

It is an object of the disclosed invention to obviate one or more above stated shortcomings and provide an inverted charge pump and a circuit for generating a negative voltage from a high voltage source with one or more on-chip pre-drivers thereby eliminating the requirement of an additional pin, capacitor and a regulator in a capacitive charge pump based DC-to-DC converter.

It is further an object of the present invention to provide a charge pump with an output voltage regulation scheme to support operation over a wide load current range with a constant frequency spectrum at the output.

Embodiments of high voltage tolerant inverting charge pumps are disclosed. In an embodiment, the charge pump for generating a negative voltage includes a first terminal for receiving a dc input voltage. The charge pump also includes a second and a third terminal for connecting to a flying capacitor. Further, the charge pump includes a fourth terminal for supplying the negative voltage as output. The charge pump also includes a charging path and a dumping path. The charging path comprises a first pre-driver circuit connected to the first terminal to drive a first switching arrangement. The first switching arrangement is connected to the second terminal.

A first current limit device is connected with the first switching arrangement. A second pre-driver circuit is connected to the first terminal and drives a second switching arrangement. The second switching arrangement is connected to the third terminal through a first cascode device.

The dumping path comprises a third pre-driver circuit connected to the first terminal and drives a third switching arrangement. The third switching arrangement is connected to the second terminal and the fourth terminal. A second current limiting device is connected in series to a negative feedback controller and to a second cascode device. The second cascode device may be connected to the third terminal. In addition, a negative feedback controller is connected to the fourth terminal.

According to yet another embodiment of the present invention, a circuit for generating a negative voltage from a high voltage source is disclosed. The circuit includes one or more high voltage tolerant pre-driver circuits connected to the high voltage source (e.g. a DC battery). A flying capacitive element connects to the high voltage source through one or more low voltage semiconductor devices. One or more pre-driver circuits derive voltage from the high voltage source and drive the low voltage semiconductor devices.

The circuit also includes an output capacitor that connects to the flying capacitor through the one or more low voltage semiconductor devices. In addition, a negative feedback controller connects to the output capacitor to regulate the output voltage.

BRIEF DESCRIPTION OF THE DRAWINGS

To further clarify the above and other advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings in which.

DETAILED DESCRIPTION

Embodiments of High-Voltage (HV) tolerant regulated inverting charge pump circuit are disclosed. Existing inverting charge pumps have inherent limitations of lower range of output current, variable output voltage frequency spectrum, and undesirable consumption of both on-chip and off-chip area. As would be clear from the following description, the disclosed inverting charge pump gets an input voltage directly from a DC battery without having an intermediate voltage regulator (e.g. 202). The disclosed inverting charge pump also eliminates the requirement of an additional capacitor (e.g. regulating capacitor $C_{reg}$ 208) thereby keeping the external pin, component count and on-chip area to a minimum.

Figure 3:
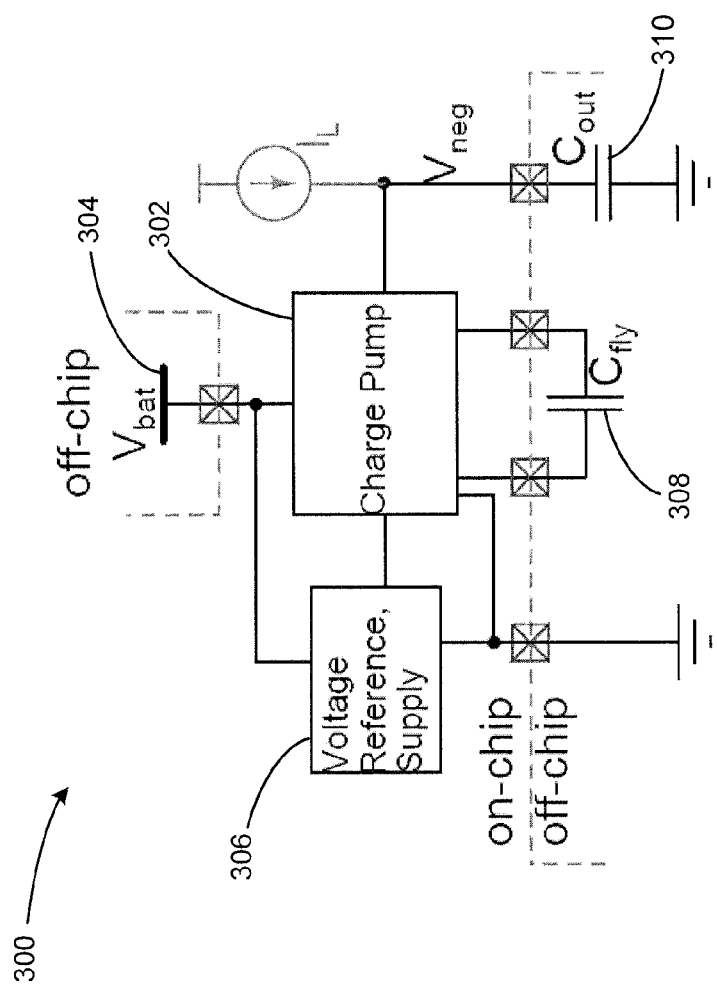
FIG. 3 illustrates an inverting charge pump circuit according to an embodiment of the present invention.

FIG. 3 illustrates an inverting charge pump circuit 300 according to an embodiment of the present invention. As shown in the FIG., the circuit 300 includes an inverting charge pump 302 connected directly to a battery or a DC voltage source 304. The inverting charge pump 302 includes a high voltage circuitry that enables operation from a high voltage source (DC battery). The circuitry provides protection from undesirable effects of a high voltage DC supply. In addition, the charge pump 300 is implemented using low voltage semiconductor devices that have high switching speeds and small size thereby keeping the on-chip area minimum for a given configuration.

The battery 304 can be any standard DC voltage source, such as but not limited to, metal-ion batteries, metal-poly batteries, lead-acid batteries, metal ion poly batteries, etc. It is to be noted here that the battery 304 preferably can be of types that are used in portable devices like MP3 players, mobile phones, walkie-talkies, and other similar computing devices where the battery source provides positive rail voltage and there is a need for an inverting charge pump to provide negative voltage from the positive rail.

The circuit 300 also includes a voltage reference supply 306 that provides various internal voltages ($V_{dd}$, $V_{ref}$, $V_{fgnd}$, and $V_{biasn}$ etc.) required by the charge pump 302. The internal voltages drive one or more of the blocks of the inverting charge pump 302. It is to be noted that the charge pump 302 and the voltage reference supply 306 are on-chip components.

In addition to the on-chip components, the circuit 300 also includes off-chip components. For instance, a flying capacitor ($C_{fly}$) 308 is connected to two terminals of the charge pump 302 and an output capacitor ($C_{out}$) 310 is connected to yet another terminal of the charge pump 302.

The flying capacitor 308 charges to a pre-defined voltage in a charging phase and discharges in a dumping phase in a controlled manner. The discharging flying capacitor 308 charges the output capacitor 310 during the dumping phase and the voltage thus developed across the output capacitor serves as the output negative voltage.

Figure 4:
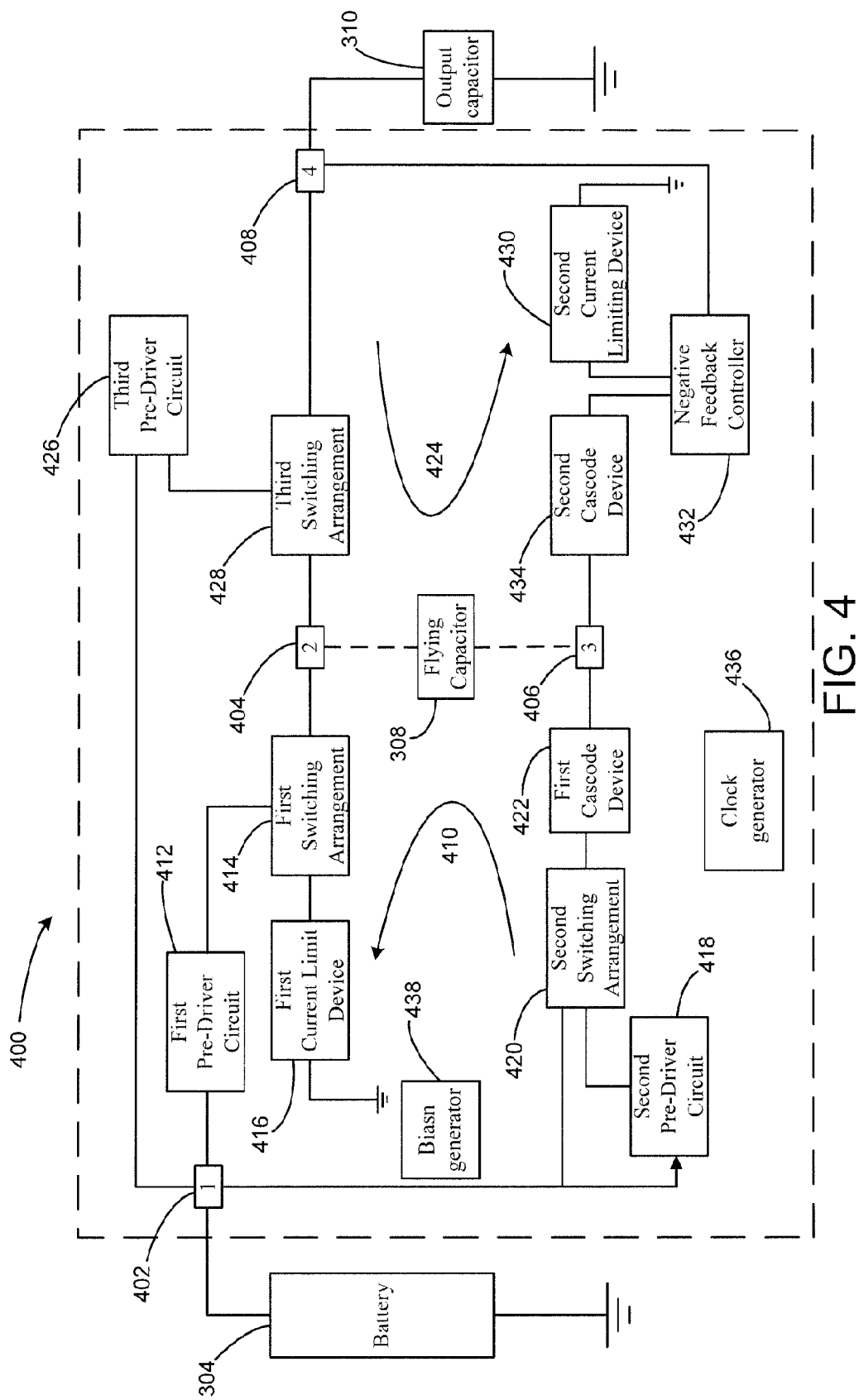
FIG. 4 illustrates a block diagram of an inverting charge pump according to an embodiment of the present invention.

FIG. 4 illustrates an exemplary block diagram of an inverting charge pump 400 according to an embodiment of the present invention. The inverting charge pump 400 includes at least four terminals 402, 404, 406 and 408. The first terminal 402 of the charge pump 400 is configured for receiving a dc input voltage from the battery 304. The second terminal 404 and a third terminal 406 of the charge pump 400 are configured for connecting the flying capacitor 308. The fourth terminal 408 of the charge pump 400 is configured for connecting the output capacitor 310.

As discussed earlier, the flying capacitor 308 is charged to a pre-defined voltage during a charging phase. To this end, the inverting charge pump 400 includes a charging path 410 that has circuit elements for the charging of the flying capacitor 308. For example, the charging path 410 may include a first pre-driver circuit 412 that drives a first switching arrangement 414. The first pre-driver circuit 412 is a high voltage tolerant circuit that enables a direct connection of the inverting charge pump 400 to the battery 304 a shown in the figure. The components of the first pre-driver circuit 412 are described in detail with reference to FIGS. 7 and 8.

The first switching arrangement 414 connects to the second terminal 404 at one end and to a first current limiting device 416 at the other end. The first current limit device 416 connects to the first switching arrangement 414 at one end and is grounded at the other end.

The charging path 410 also includes a second pre-driver circuit 418 that drives a second switching arrangement 420. The second switching arrangement 420 connects to the third terminal 406 through a first cascode device 422 at one end and to the first terminal 402 at the other end.

The charge pump 400 further includes a dumping path 424 to facilitate the discharging of the flying capacitor 308 and charging of the output capacitor 310. The dumping path includes a third pre-driver circuit 426 driving a third switching arrangement 428. The third switching arrangement 428 connects to the second terminal 404 at one end and to the fourth terminal 408 at the other end.

The dumping path 424 further includes a second current limiting device 430 that connects in series to a negative feedback controller 432 and a second cascode device 434, at one end and grounded at the other end. The second cascode device 434 connects to the third terminal 406 at one end and the negative feedback controller 432 at the other end.

In an exemplary embodiment, the first switching arrangement 414, second switching arrangement 420, and the third switching arrangement 428 may include one or more Metal Oxide Semiconductor (MOS) transistor being driven by the first pre-driver circuit 412, second pre-driver circuit 418, and third pre-driver circuit 426 respectively.

Further, the first switching arrangement 414 and the third switching arrangement 428 include at least one high on-resistance Metal Oxide Semiconductor (MOS) transistor and at least one low on-resistance Metal Oxide Semiconductor (MOS) transistor.

The inverting pump 400 according to an embodiment of the present invention includes a clock generator 436 configured to generate clock signals to drive the first, second and third pre-driver circuits (412, 418, and 426). The clock signals are provided in such a manner that during the charging phase, the components in the charging path 410 conduct and during the dumping phase, the components in the dumping path 424 conduct. In addition, at least one of the generated clock signals drives the negative feedback controller 432 configured to regulate the output negative voltage. The clock generator 436 prevents a variable frequency spectrum in the output of the charge pumps by generating 4-phase signals to drive the components of the inverting charge pump 400.

In yet another embodiment, the first, second and third pre-driver circuits (412, 418, and 426) include one or more clock level shifters and a high voltage protection circuit.

Furthermore, the charge pump 400 further includes a Biasn generator 438 for providing bias voltages to the one or more Metal Oxide Semiconductor (MOS) transistor devices. The first cascode device 422 and the second cascode device 434 correspond to Metal Oxide Semiconductor (MOS) transistors. Although, Biasn generator 438 has been shown as a separate block included in the charge pump 400, in an alternative embodiment, the bias generator 438 can be integrated with the voltage reference supply 306 as a single module.

In an exemplary implementation, the negative feedback controller 432 includes a feedback network, an error amplifier, and a negative feedback loop compensator. The components of the negative feedback controller 432 have been described in detail with reference to FIG. 6.

Figure 5:
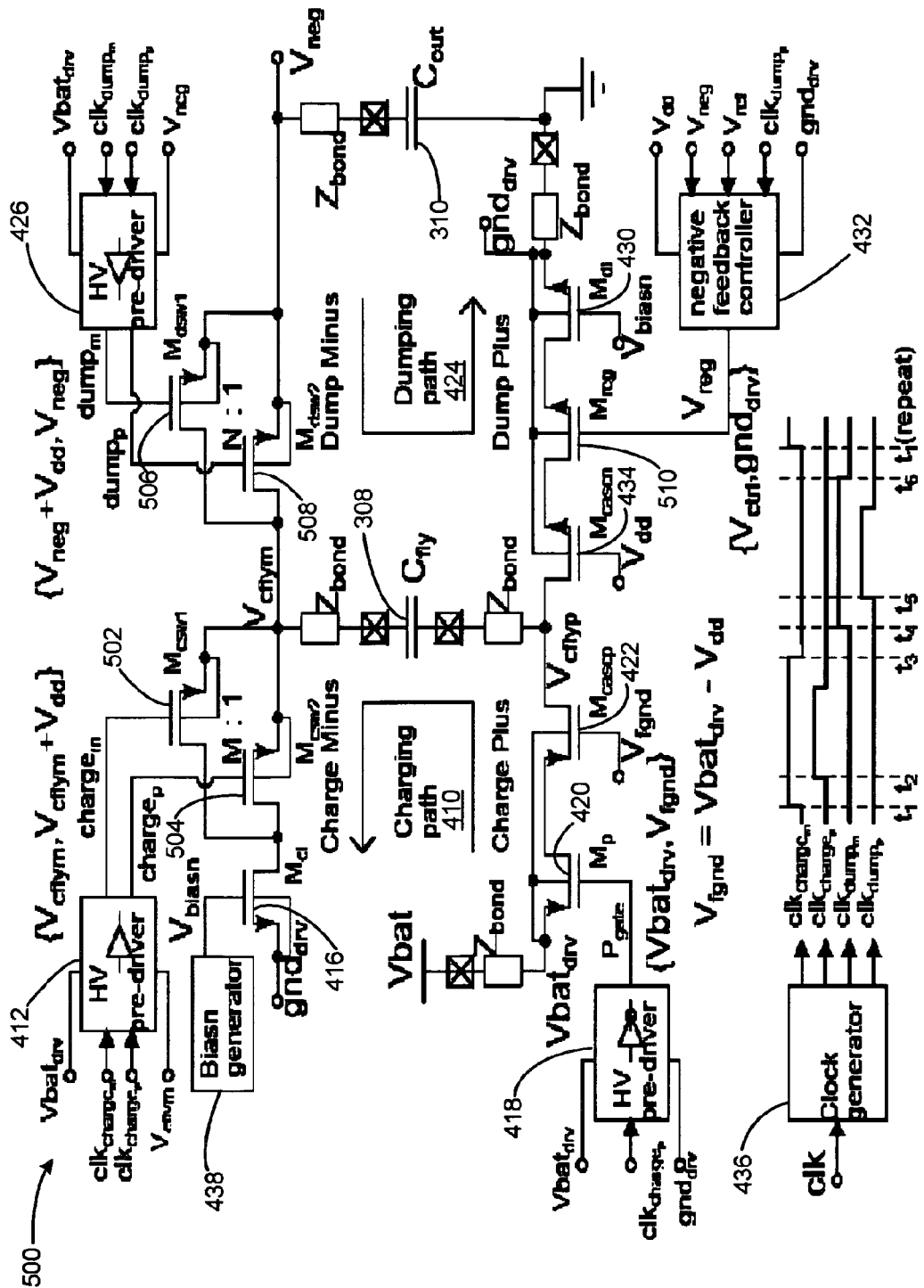
FIG. 5 illustrates a detailed circuit diagram of inverting charge pump according to an exemplary embodiment of the present invention.

FIG. 5 illustrates a detailed circuit diagram of inverting charge pump 500 according to an exemplary embodiment. The block diagram of FIG. 4 corresponds to FIG. 5 and the circuit elements shown in FIG. 5 have been illustrated as an example case of charge pump illustrated in FIG. 3 and FIG. 4. It would be appreciated by those skilled in the art that other arrangements are possible without departing from the scope of the ongoing description.

According to an embodiment, the inverting charge pump circuit 500 includes a charging path 410. The charging path enables the charging of the flying capacitor 308 up to a predefined voltage. The predefined voltage depends on the magnitude of negative voltage required to be generated at the output of the inverting charge pump and in an embodiment, it is the same as the high voltage dc input to the charge pump. The output voltage corresponds to the voltage across the output capacitor 310.

The charging path 410 includes a first high voltage pre-driver 412 that drives two Metal Oxide Semiconductor (MOS) transistor devices (e.g. NMOS transistors), such as, $M_{csw1}$ 502 and $M_{csw2}$ 504 respectively. The two MOS devices 502 and 504 form the first switching arrangement 414 of FIG. 4. The charging path 410 further includes a current limiting MOS transistor device $M_{c1}$ 416 implemented as the first current limiting device 416 (of FIG. 4) that is driven by a Biasn generator 438. In an exemplary embodiment, the Biasn generator 438 corresponds to a biasing circuit for an NMOS transistor which can be implemented as the current limiting MOS transistor device $M_{c1}$ 416. The charging path 410 also includes a second high voltage pre-driver 418 that drives a MOS transistor device $M_p$ 420 (e.g. PMOS transistor) that corresponds to the second switching arrangement 420 in FIG. 4. The MOS transistor device $M_p$ 420 is connected to $V_{bat}$ at one end and another MOS transistor device $M_{cascp}$ 422 (e.g. PMOS transistor) implemented as the first cascode device 422 at the other end.

The inverting charge pump circuit 500 further includes a dumping path 424 that facilitates the dumping of the charge from the flying capacitor 308 to charge the output capacitor 310. According to an embodiment, the dumping path 424 includes a third high voltage pre-driver 426 that drives two MOS transistor devices (e.g. NMOS transistors) $M_{dsw1}$ 506 and $M_{dsw2}$ 508 that form the third switching arrangement 428 in FIG. 4. The dumping path 424 also includes a current limiting MOS transistor $M_{d1}$ 430 implemented as the second current limiting device 430 of FIG. 4. The current limiting MOS transistor $M_{d1}$ 430 connects in series to a voltage regulating transistor (e.g. PMOS transistor) $M_{reg}$ 510 that introduces an error feedback signal from a negative feedback controller 432. The voltage regulating transistor $M_{reg}$ 510 connects to a cascode MOS transistor device (PMOS transistor) 434 that is implemented as the second cascode device 434 of FIG. 4.

The inverting charge pump circuit 500 further includes a clock generator 436 that provides for clock signals required to drive the first pre-driver 412, second pre-driver 418, third pre-driver 426, and negative feedback controller 432.

The High-Voltage (HV) tolerant regulated inverting charge pump circuit 500 as shown in FIG. 5 utilizes low-voltage MOS transistors. Due to the high voltage tolerant pre-driver, the charge pump can be operated directly from a battery or a HV DC voltage source $V_{bat}$ 304. Furthermore, the inverting charge pump 500 with the disclosed output voltage regulation scheme can be operated over a wide load current range (e.g. $I_{max}/I_{min}$~1000). The two peak current limit transistors 416 and 430, included in the charging path 410 and the dumping path 424 respectively ensures reliable operation in the presence of the bond wire parasitic ($Z_{bond}$) and also limits the Joule heating in the charge path and dump path driver devices and the associated metal interconnects.

The current limiting transistor 430 also forms a part of a dump phase error feedback regulation loop. The dump phase error feedback regulation loop is formed when the fourth terminal 408 is connected to the negative feedback controller 432 to regulate the negative output voltage. The dump phase error feedback regulation loop utilizes the current limit transistor 430 in series with the regulation control transistor $M_{reg}$ 510 as the composite control element for controlling the dump phase current to regulate the charge pump output voltage over a wide range of load currents.

The two MOS transistor devices (e.g. NMOS transistors) that form the first switching arrangement 502, 504 and the third switching arrangement 506, 508 are split into two parts, a high on resistance switch, and a low on resistance switch. For example, the NMOS transistors 502 and 504 will have their resistances in the ratio of M:1 when operated in the linear region of the transistor characteristics. The gate terminals of the MOS transistor devices 502 and 504 are connected with the first pre-driver 412 and the gate terminals of the MOS transistor devices 506 and 508 are connected with the third pre-driver 426. The source terminals of the Metal Oxide Semiconductor (MOS) transistors 502, 504 of the first switching arrangement 414 are connected to the second terminal 404 in the charging path 410. In addition, the drain terminals of the Metal Oxide Semiconductor (MOS) transistors 506, 508 of the third switching arrangement 428 are connected to the second terminal 404 in the dumping path 424.

Operation:

According to an exemplary embodiment, the charging path/phase of the inverting charge pump circuit 500 is split into 'Charge Minus' and 'Charge Plus' paths/phases associated with the first pre-driver 412 and the second pre-driver 418 respectively. Similarly, the dumping path/phase of the charge pump circuit 500 is split into 'Dump Plus' and 'Dump Minus' paths/phases associated with negative feedback controller 432 and the third pre-driver 426 respectively. Desired voltage levels at the pre-driver outputs are shown in FIG. 5 for the exemplary embodiment.

The clock generator 436 generates a 4-phase clock from an input clock, which is fed as inputs into the pre-driver blocks (412, 418, and 426) and the negative feedback controller 432 respectively. The clock signals and the waveforms generated by the clock generator 436 according to an embodiment have been illustrated in FIG. 5. As indicated in the waveforms, the clock generator 436 ensures a non-overlap time ($t_3$-$t_4$, $t_6$-$t_1$) between the charging and the dumping paths to eliminate a direct path between ($gnd_{drv}$, $V_{neg}$) and ($Vbat_{drv}$, $gnd_{drv}$).

In an exemplary implementation, the clock signals $CLK_{chargem}$ and $CLK_{dumpm}$ as shown in FIG. 5 are typically high (digital '1' or 'on') for a longer time period as compared to the clock signals $CLK_{chargep}$ and $CLK_{dumpp}$. In addition, the on periods for the clock signals $CLK_{chargem}$ and $CLK_{dumpm}$ start before the clock signals $CLK_{chargep}$ and $CLK_{dumpp}$ respectively. In one of the embodiments, the clock signals $CLK_{chargem}$ and $CLK_{dumpm}$ end (or become low) after the clock signals $CLK_{chargep}$ and $CLK_{dumpp}$ have become low respectively as shown in FIG. 5. Although, the clock signals $CLK_{chargem}$ and $CLK_{chargep}$ and the clock signals $CLK_{dumpm}$ and $CLK_{dumpp}$ have been shown to end at different time instances, it may be appreciated that the clock signals $CLK_{chargem}$ and $CLK_{chargep}$ and clock signals $CLK_{dumpm}$ and $CLK_{dumpp}$ can end at the same time.

The clock signals $CLK_{chargem}$ and $CLK_{chargep}$ control the HV tolerant pre-drivers to turn on the MOS transistor devices 502 and 504 respectively during the charging phase of the charge pump 500. Likewise, the clock signals $CLK_{dumpm}$ and $CLK_{dumpp}$ control the HV tolerant pre-drivers to turn on the MOS transistor devices 506 and 508 respectively during the dumping phase of the charge pump 500

Charge Plus Path:

Charge plus path includes the PMOS switch device $M_p$ 420 which is turned on and off with [$V_{fgnd}$, $Vbat_{drv}$] voltage levels respectively so that there is no Gate-Oxide-Integrity (GOI) stress. The charge plus path also includes the PMOS cascode device $M_{cascp}$ 422 with its gate biased at $V_{fgnd}$ (=$V_{bat}$-$V_{dd}$) for high voltage protection which ensures that the source terminal of $M_{cascp}$ 422 never goes below $V_{fgnd}$+$V_t$ (threshold voltage of $M_{cascp}$). The cascode device $M_{cascp}$ 422 ensures that the switching MOS device $M_p$ 420 is protected from GOI and Hot-Carrier-Injection (HCI) stresses even when $V_{cflyp}$ goes to '0' volts. In addition, $M_{cascp}$ is also protected for $V_{cflyp}$ lying in the range of [0, $V_{bat}$].

Charge Minus Path:

The charge minus path includes the current limiting MOS transistor '$M_{c1}$' 416 that is a NMOS peak current limit device with its gate biased at $V_{biasn}$ with respect to $gnd_{drv}$. $V_{biasn}$ is an appropriate bias voltage, generated in the 'Bias generator' 438, that limits the peak current to the desired level. The same $V_{biasn}$ voltage is used to bias a current limit transistor '$M_{d1}$' 430 in the 'dump plus' path also. The peak current limit is implemented to minimize the high frequency voltage ringing amplitude in the charge path and the dump path in the presence of the bond-wire parasitic $Z_{bond}$. Further, limiting the peak current also ensures that the joule heating in the driver during the charge pump operation is within limits.

The switching devices 502, 504 are split in the ratio $M_{csw1}$:$M_{csw2}$=1:M. M corresponds to ratio of on-resistance of $M_{csw1}$ with respect to $M_{csw2}$. The two switching devices 502, 504 act as a high on-resistance switch and low on-resistance switch respectively. Accordingly, the MOS transistor 502 is referred to as "weak switch" and the MOS transistor 504 is referred to as "strong switch".

The back-gate of the switching device 502 is connected to $V_{cflym}$ to eliminate the conducting path between $gnd_{drv}$ and $V_{neg}$, through the parasitic PN well diode associated with $M_{c1}$ 416 during the dumping phase. While transitioning from non-overlap time interval to charge phase ($t_6$ to $t_1$), a weak switching device $M_{csw1}$ is turned on first at time $t_1$, with $clk_{chargem}$ phase, so that the transition of $V_{cflym}$ from $V_{neg}$ to $gnd_{drv}$ is slow enough to eliminate high frequency, high amplitude oscillations in the presence of the bond wire parasitic $Z_{bond}$. At time $t_2$, after $V_{cflym}$ has settled to $gnd_{drv}$, a strong switching device $M_{csw2}$ is turned on with $clk_{chargep}$ phase initiating the charging of the flying capacitor $C_{fly}$ 308.

Dump Minus Path:

In the dump minus path, the switching devices 506, 508 are split in the ratio $M_{dsw1}$:$M_{dsw2}$=1:N. N refers to the ratio of on-resistance of $M_{dsw1}$ with respect to $M_{dsw2}$. While transitioning from non-overlap time interval to dump phase ($t_3$ to $t_4$), a weak switching device $M_{dsw1}$ is turned on first at time $t_4$, with $clk_{dumpm}$ phase, so that the transition of $V_{cflym}$ from $gnd_{drv}$ to $V_{neg}$ is slow enough to eliminate high frequency, high amplitude oscillations in the presence of the bond wire parasitic $Z_{bond}$. At time $t_5$, after $V_{cflym}$ has settled to $V_{neg}$, a strong switching device $M_{dsw2}$ is turned on with $clk_{dump}$ phase initiating the dumping of charge from flying capacitor $C_{fly}$ 308 to the output $C_{out}$ capacitor 310.

Dump Plus Path

In the dump plus path, $V_{neg}$ is compared with $V_{ref}$ to regulate it to "-$V_{ref}$" in the $clk_{dumpp}$ dump phase. The negative feedback controller 432 is an analog error type device. The peak current limit device '$M_{d1}$' 430 has its gate biased at $V_{biasn}$ with respect to $gnd_{drv}$. $V_{biasn}$ is an appropriate voltage to limit the peak current within the desired level and is generated by the Biasn generator 438.

The dump plus path also includes a MOS transistor device $M_{reg}$ whose gate terminal is fed with the regulation control voltage $V_{reg}$. The $M_{reg}$ along with $M_{d1}$ in series forms the composite control element and last stage in the dump phase negative feedback regulation loop. The proposed composite control element enables output voltage regulation over a wide range of load current (e.g. $I_{max}$/$I_{min}$~1000). Such large ratios are possible because the control (voltage) directly acts on the power devices (circuit components in the dumping path) without any indirect manipulations like large ratio current mirroring blocks in between error amplifier output and the power devices as in the existing solutions.

The cascode device, $M_{cascn}$ 434 has the gate biased at an appropriate voltage ($V_{dd}$). The $M_{cascn}$ is so configured to protect $M_{reg}$ and $M_{d1}$, from HCl and GOI stress, when $V_{cflyp}$ goes to $V_{bat}$ level voltages.

Figure 1:
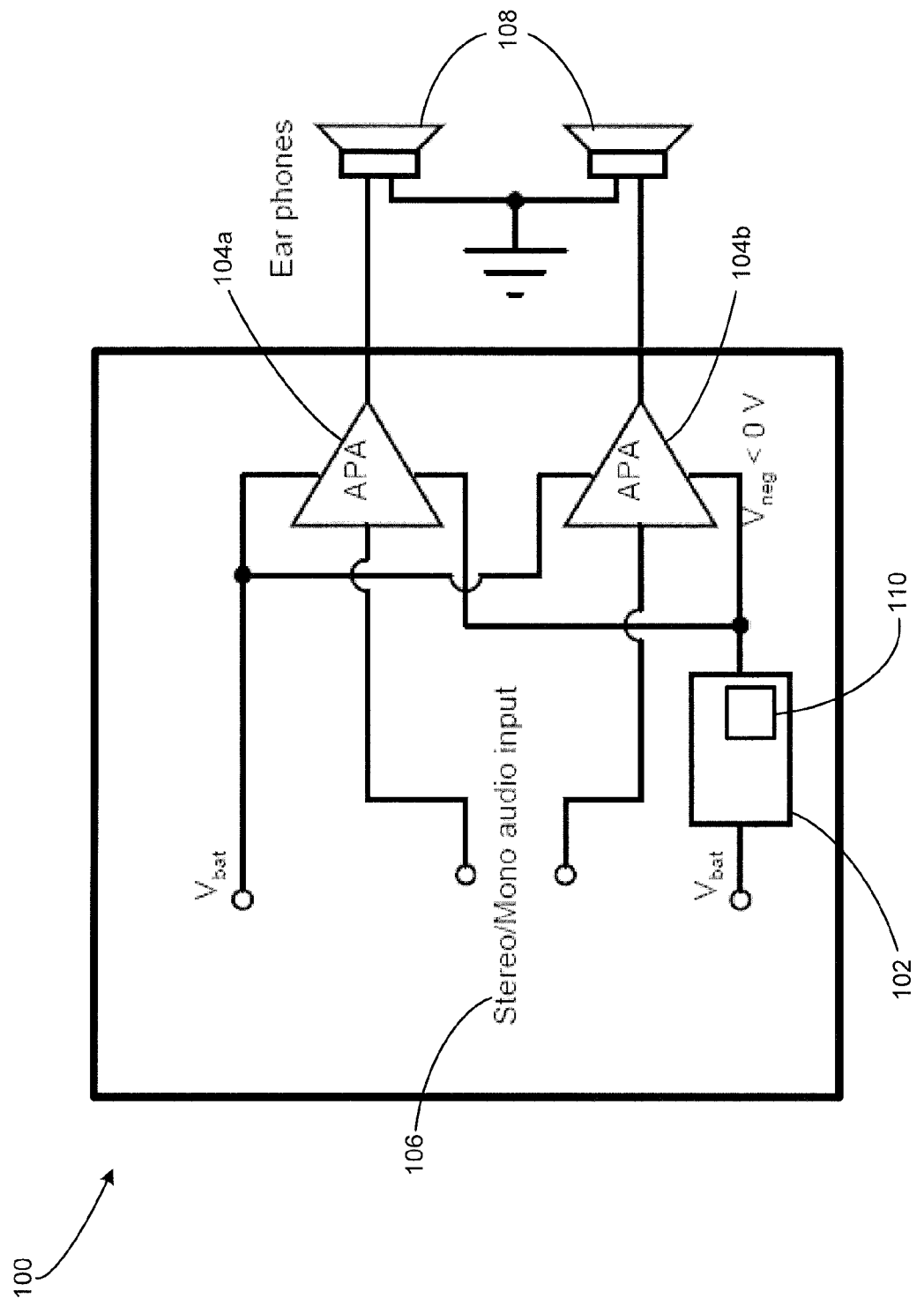
FIG. 1 illustrates a typical audio sub-system in a mobile handset.
Figure 2:
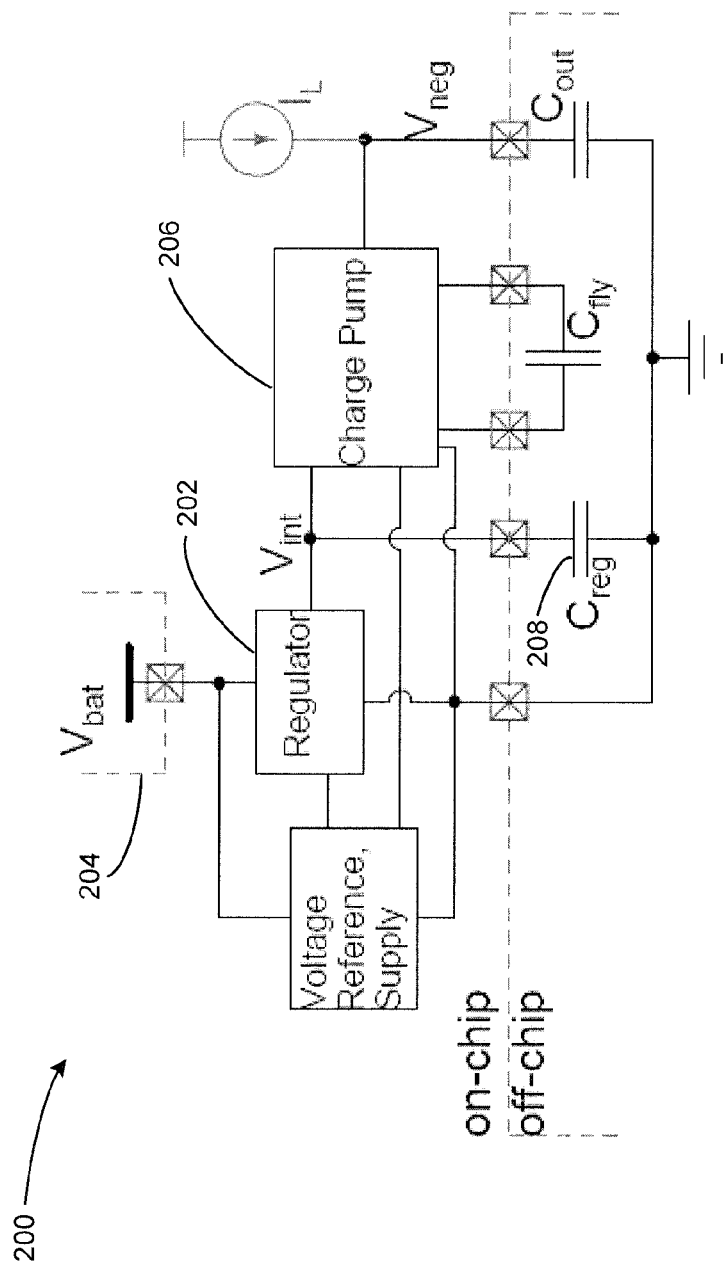
FIG. 2 illustrates a circuit diagram of an existing inverting charge pump.

It may be noted that the existing charge pump (e.g. 206 of FIG. 2) in operation may include charge plus, charge minus, dump plus, and dump minus paths formed by state-of-the art circuit elements. In addition, the charge pump 206 may also include a clock generator configured to generate appropriate clock signals to charge and discharge the flying capacitor $C_{fly}$. However, the disclosed charge pump 302 differs from the existing inverting charge pump circuits (e.g. 206) at least due to the high voltage tolerant pre-driver circuits and the use of 4-phase clock signals that drive the pre-driver circuits and the negative feedback controller 432.

Negative Feedback Controller

Figure 6:
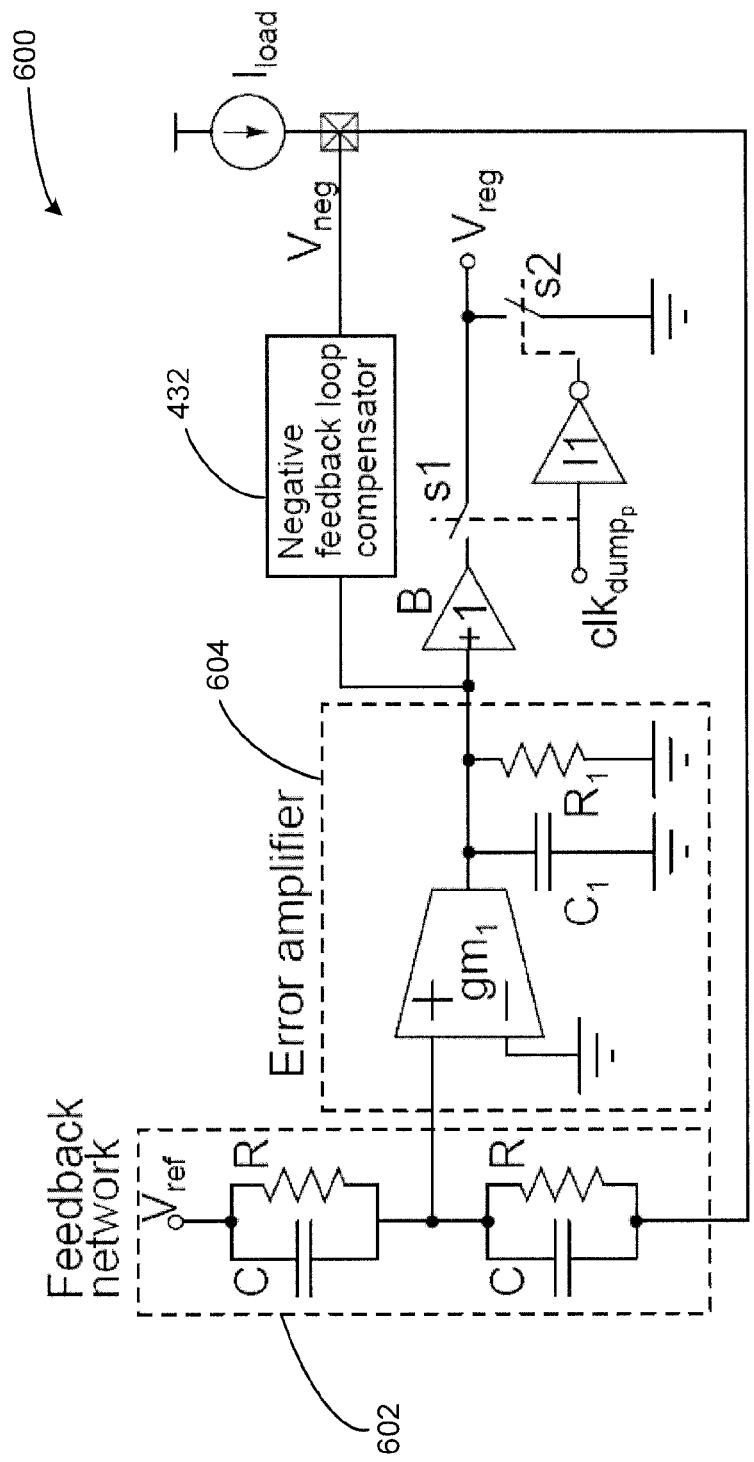
FIG. 6 illustrates a negative feedback controller according to an example embodiment of the present invention.

FIG. 6 illustrates an example embodiment of a negative feedback controller 600. It may be noted that negative feedback controller 600 is one of the embodiments of the negative feedback controller 432 (as shown in FIG. 4 and FIG. 5). The negative feedback controller 600 includes a resistor capacitor (RC) based feedback network 602 with one end connected to $V_{ref}$ and other end connected to $V_{neg}$ as shown in the FIG. 6. The middle point voltage is compared with '0' volts at an error amplifier 604. The error amplifier 604 comprises a single gain ($gm_1$, $R_1$, $C_1$) stage. The output of the error amplifier is buffered with a unity gain stage before controlling the gate of the regulating MOS transistor device $M_{reg}$.

A negative feedback loop compensator 432 is used between the $V_{neg}$ node and the output of the error amplifier 604, to stabilize the dump phase control loop to ensure that the transient loop dynamics of the charge pump 500 are controlled. When the $clk_{dumpp}$ is logic 'high', switch s1 closes, s2 opens, and the regulation loop is enabled. $V_{reg}$ node is controlled to regulate $V_{neg}$ to '$-V_{ref}$' voltage. When the $clk_{dumpp}$ is logic 'low', switch s1 opens and s2 closes and $V_{reg}$ is connected to '0' V thereby disabling the dump phase control loop.

Figure 7:
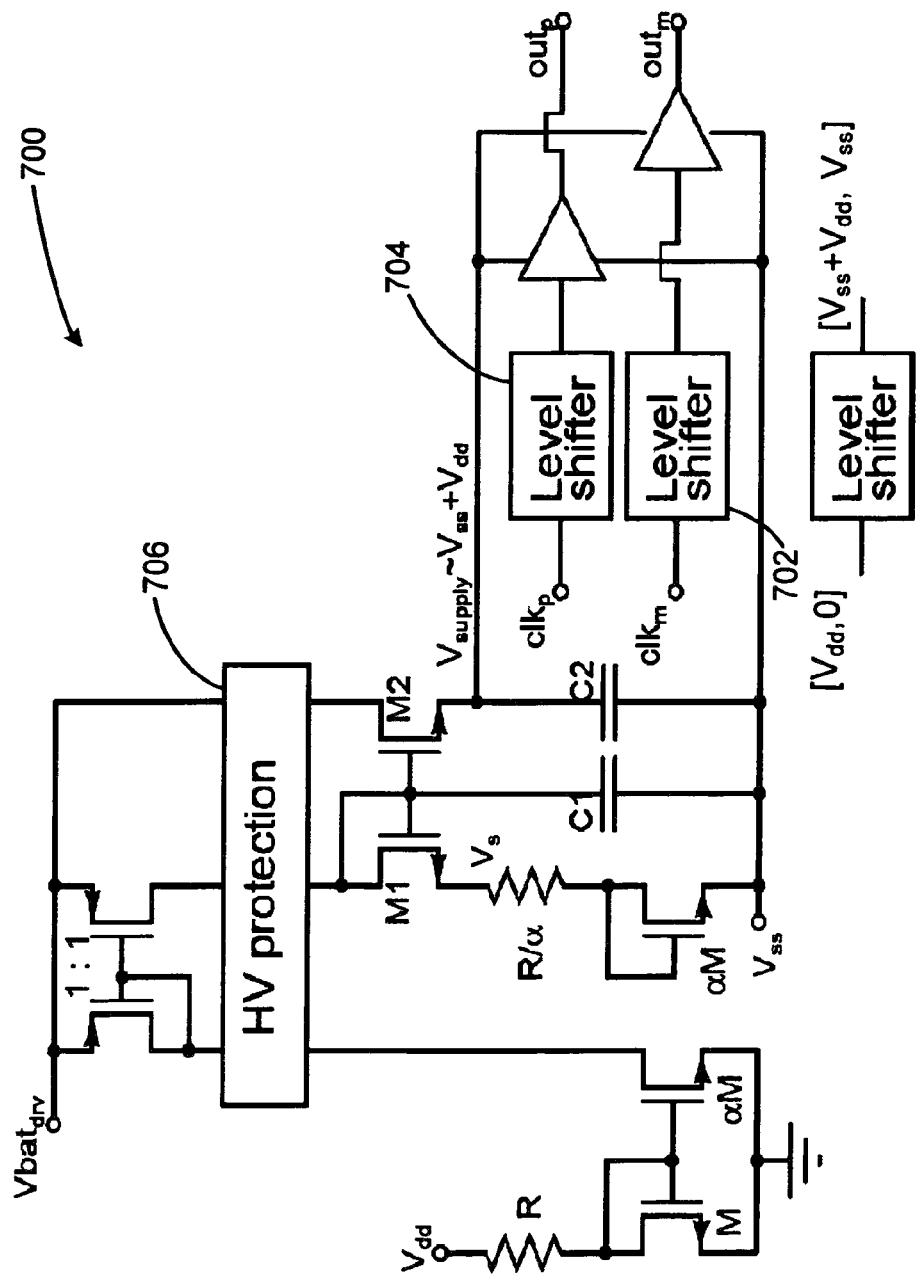
FIG. 7 illustrates a HV tolerant pre-driver circuit diagram for dump minus/charge minus path according to an example embodiment of the present invention.

HV Tolerant Pre-Driver for Dump Minus/Charge Minus Path:

FIG. 7 illustrates an example embodiment of a HV tolerant pre-driver 700 for the dump minus/charge minus path according to an embodiment. In an exemplary implementation, the topology of the pre-drivers 412 and 426 (charge minus and dump minus) is same and the high voltage pre-driver 700 illustrates an example of the high voltage pre-driver blocks 412, 418, 426, etc. It is to be noted that the topologies may be different to suit different circuit design requirements. The high-voltage tolerant pre-driver circuits have one or more level shifters 702, 704 and high voltage protection circuit 706.

For the charge minus pre-driver 412, $V_{ss}$ is connected to $V_{cflym}$ which is a switching waveform during the charge pump operation. The $V_{ss}$ alternates between $V_{neg}$ and $gnd_{drv}$ for the charge minus path. Further, in the dump minus path, $V_{ss}$ corresponds to $V_{neg}$. In both the cases, to turn on/off the respective paths, outputs of the corresponding pre-drivers have to be equal to $(V_{ss}+V_{dd})/V_{ss}$. The output voltage turns on/off the corresponding NMOS switching devices, [$M_{csw1}$, $M_{csw2}$] and [$M_{dsw1}$, $M_{dsw2}$] in the charge minus and dump minus paths respectively. A pre-distorted reference current is generated with $V_{dd}$ applied across the resistor 'R' and the series NMOS transistor, with drain and gate terminals shorted together, with a unit size of 'M'. The current thus generated is scaled up by 'α' and transported to $Vbat_{drv}$ level after passing through the HV protection block.

A mirrored current from $Vbat_{drv}$ level after passing through a HV protection block flows through a series combination of resistor R/α, series NMOS transistors, with drain and gate terminals shorted, with a unit size of 'αM' and M1.

In the pre-driver circuit 700 for dump minus/charge minus path, the biasing voltage $V_s$ voltage is equal to $(V_{ss}+V_{dd})$. $V_s$, being a high impedance reference voltage is buffered by a class-B sourcing stage implemented with MOS transistor M1 with its drain and gate terminals shorted together. MOS transistor M2's drain is connected to $V_{bat}$ through the HV protection block and the source terminal provides the locally referred supply voltage $V_{supply}$ ($\sim V_{ss}+V_{dd}$) for the pre-drivers.

The capacitor C1 provides low impedance for the reference voltage w.r.t. $V_{ss}$ at the gates of M1, M2 to handle the switching transient kick-back when the pre-drivers are operational and switching. A capacitor $C_2$ provides low impedance at $V_{supply}$ to provide the high frequency switching currents. Two level shifters are used to translate the two clock phases in [$V_{dd}$, 0] voltage domain to [$V_{ss}+V_{dd}$, $V_{ss}$] voltage domain.

The level shifter 702 & 704 provide level shifted clock signals that are used to drive the appropriately sized pre-drivers, shown as buffers in the FIG. 7, operating on the local supply $V_{supply}$ which in turn drives the power devices [$M_{csw1}$, $M_{csw2}$] and [$M_{dsw1}$, $M_{dsw2}$] in the charge minus and dump minus paths respectively.

Figure 8:
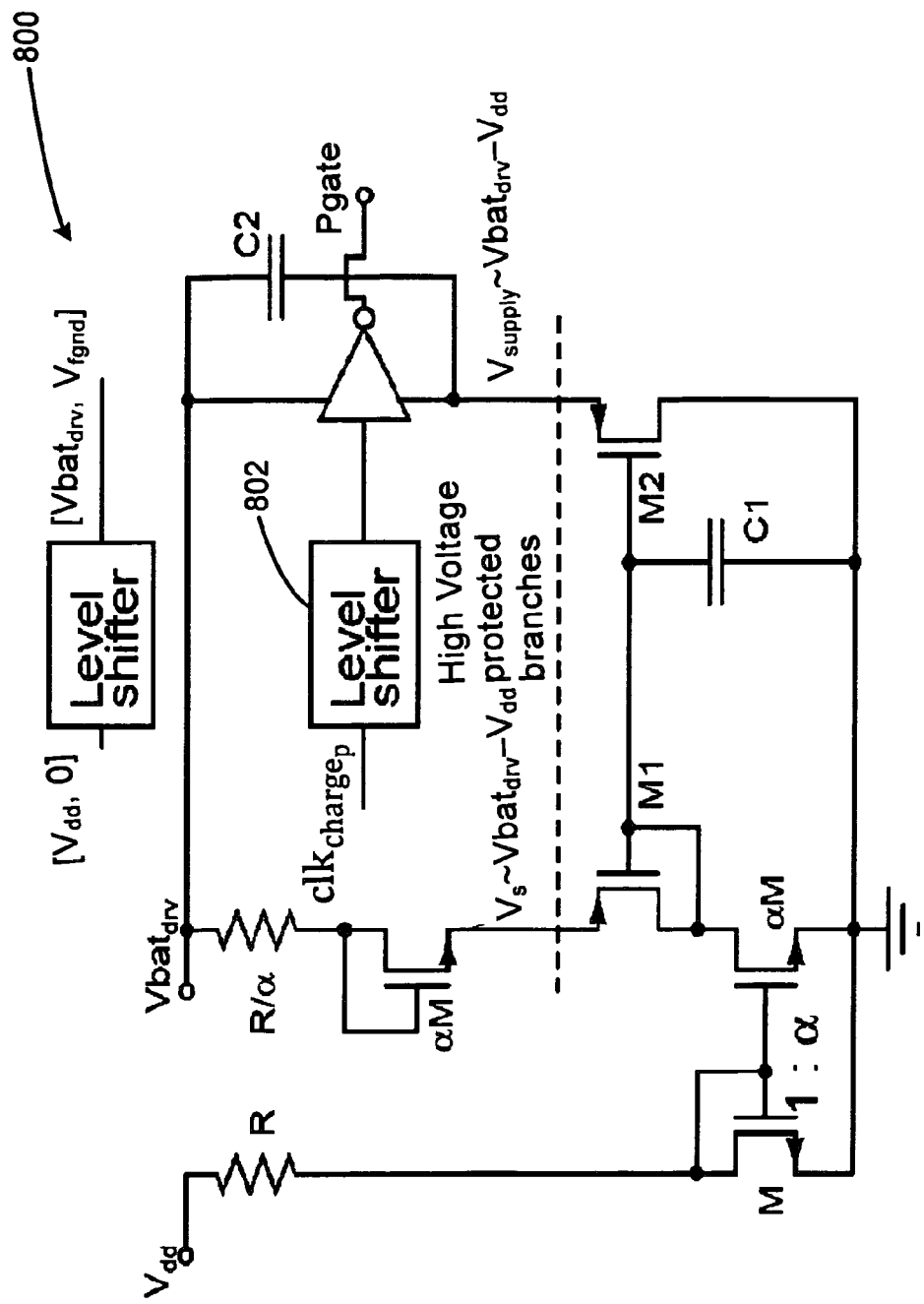
FIG. 8 illustrates a HV tolerant pre-driver circuit diagram for charge plus path according to another example embodiment of the present invention.

HV Tolerant Pre-Driver for Charge Plus Path:

FIG. 8 illustrates an example embodiment of a HV tolerant pre-driver 800 for charge plus path. As illustrated in the pre-driver circuit 800, to turn on/off the PMOS switch device $M_p$ 420, $P_{gate}$ is made to swing between ($V_{fgnd}/V_{bat}$). $V_{fgnd}=$ ($V_{bat}-V_{dd}$) is a bias voltage internally generated by the Biasn generator 438.

A pre-distorted reference current is generated with $V_{dd}$ applied across a resistor 'R' and a series NMOS transistor, with drain and gate terminals shorted together, with a unit size of 'M'. The current generated is scaled up by 'α'. The mirrored current is made to flow through the series combination of the resistor R/α, series NMOS transistors, with drain and gate terminals shorted together, with a unit size of 'αM' and M1 connected to $Vbat_{drv}$.

The proposed biasing, $V_s$ voltage is $Vbat_{drv}-V_{dd}$. This high impedance reference voltage is buffered by a class-B sinking stage implemented with $M_1$ with its drain and gate terminals shorted together and $M_2$ with drain connected to $gnd_{drv}$ and the source terminal providing the locally referred supply voltage $V_{supply}$ ($\sim Vbat_{drv}-V_{dd}$) for the pre-driver. The two branches of the class-B sinking stage are protected for operation directly between $Vbat_{drv}$ and $gnd_{drv}$.

Further, the HV tolerant pre-driver 800 for charge plus path includes a capacitor $C_1$ that provides low impedance for the reference voltage at the gates of M1 and M2 to handle the switching transient kick-back when the pre-drivers are operational and switching. The capacitor $C_2$ provides low impedance at $V_{supply}$ to provide high frequency switching currents.

A level shifter (e.g. 802) is used to translate the clock phase, $clk_{chargep}$, in [$V_{dd}$, 0] voltage domain to [$Vbat_{drv}$, $V_{fgnd}$] voltage domain. The level shifted clock signal is used to drive the appropriately sized pre-driver, shown as an inverter in FIG. 8, operating on the local supply $V_{supply}$ which in turn drive the $P_{gate}$ of the power device $M_p$ in the charge plus path.

It is to be appreciated that the subject matter of the following claims are not limited to the various examples and language used to recite the principle of the invention, and variants can be contemplated for implementing the claims without deviating from the scope. Rather, the embodiments of the invention encompass both structural and functional equivalents thereof.

While certain present preferred embodiments of the invention and certain present preferred methods and circuits for practicing the same have been illustrated and described herein, it is to be distinctly understood that the invention is not limited thereto but may be otherwise variously embodied and practiced within the scope of the following claims.

We claim:

1. An inverting charge pump configured to generate a negative voltage, the inverting charge pump comprising:
   a first terminal configured to receive a dc input voltage;
   a second terminal and a third terminal configured to connect to a flying capacitor; and
   a fourth terminal configured to supply the negative voltage as output;
   a charging path comprising:
   a first pre-driver circuit connected to the first terminal and driving a first switching arrangement, the first switching arrangement being connected to the second terminal;
   a first current limit Metal Oxide Semiconductor, MOS, transistor device connected with the first switching arrangement and configured to limit a first switching arrangement peak current; and a second pre-driver circuit connected to the first terminal and driving a second switching arrangement connected to the third terminal through a first cascode device; and a dumping path comprising:

a third pre-driver circuit connected to the first terminal and driving a third switching arrangement, the third switching arrangement being connected to the second terminal and the fourth terminal;

a second current limiting MOS transistor device connected in series to a negative feedback controller and to a second cascode device, the second current limiting MOS transistor device being configured to limit a peak current, the second cascode device being connected to the third terminal; and the negative feedback controller being connected to the fourth terminal and being configured to regulate the negative output voltage.

2. The inverting charge pump as claimed in claim 1, wherein each of the first switching arrangement, the second switching arrangement, and the third switching arrangement comprises one or more Metal Oxide Semiconductor (MOS) transistors.

3. The inverting charge pump as claimed in claim 2, wherein the one or more MOS transistors of each of the first switching arrangement and the third switching arrangement comprises at least one high on-resistance Metal Oxide Semiconductor (MOS) transistor and at least one low on-resistance Metal Oxide Semiconductor (MOS) transistor.

4. The inverting charge pump as claimed in claim 2, wherein a source terminal of the one or more Metal Oxide Semiconductor (MOS) transistors of the first switching arrangement are connected to the second terminal of the inverting charge pump.

5. The inverting charge pump as claimed in claim 2, wherein a drain terminal of the one or more Metal Oxide Semiconductor (MOS) transistors of the third switching arrangement are connected to the second terminal of the inverting charge pump.

6. The inverting charge pump as claimed in claim 1, further comprising a clock generator configured to generate 4-phase clock signals from a single input clock signal.

7. The inverting charge pump as claimed in claim 6, wherein the 4-phase clock signals drive the first, second, third pre-driver circuits and the negative feedback controller respectively.

8. The inverting charge pump as claimed in claim 2 further comprising a biasn generator block for providing bias voltage to the one or more Metal Oxide Semiconductor (MOS) transistors.

9. The inverting charge pump as claimed in claim 1, wherein the negative feedback controller comprises a feedback network, an error amplifier, and a negative feedback loop compensator.

10. The inverting charge pump as claimed in claim 1, wherein the first, second and third pre-driver circuits comprise one or more clock level shifters and a high voltage protection circuitry.

11. The inverting charge pump as claimed in claim 1, wherein the first and second cascode devices correspond to Metal Oxide Semiconductor (MOS) transistors.

* * * * *